(12) United States Patent
Watanabe

(10) Patent No.: US 11,703,746 B2
(45) Date of Patent: Jul. 18, 2023

(54) PROJECTION OPTICAL APPARATUS, PROJECTOR, AND METHOD FOR PROJECTION OPTICAL APPARATUS THAT SUPPRESSES DEGREDATION OF A RESIN LENS

(71) Applicant: SEIKO EPSON CORPORATION, Tokyo (JP)

(72) Inventor: Kaho Watanabe, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 32 days.

(21) Appl. No.: 17/322,322

(22) Filed: May 17, 2021

(65) Prior Publication Data

US 2021/0356850 A1  Nov. 18, 2021

(30) Foreign Application Priority Data

May 18, 2020 (JP) ................. 2020-086630

(51) Int. Cl.
*G03B 21/14* (2006.01)
*G03B 21/16* (2006.01)
*G03B 21/53* (2006.01)

(52) U.S. Cl.
CPC ......... *G03B 21/142* (2013.01); *G03B 21/147* (2013.01); *G03B 21/16* (2013.01); *G03B 21/53* (2013.01)

(58) Field of Classification Search
CPC ...... G03B 21/147; G03B 21/16; G03B 21/28; G03B 21/53; G03B 21/142
See application file for complete search history.

(56) References Cited

U.S. PATENT DOCUMENTS

| | | | | |
|---|---|---|---|---|
| 6,631,994 B2 * | 10/2003 | Suzuki | ................ | G02B 7/181 348/E5.142 |
| 6,824,274 B2 * | 11/2004 | Suzuki | ................ | H04N 9/3194 348/E5.142 |
| 6,994,437 B2 * | 2/2006 | Suzuki | ................ | G02B 17/0852 348/E5.142 |
| 7,230,774 B2 * | 6/2007 | Suzuki | ................ | H04N 9/3194 359/730 |
| 7,572,014 B2 * | 8/2009 | Suzuki | ................ | H04N 9/3194 353/77 |
| 9,329,304 B2 * | 5/2016 | Norton | ................ | G01M 11/0221 |
| 9,841,578 B2 * | 12/2017 | Kuroda | ................ | G03B 21/14 |
| 9,885,803 B2 * | 2/2018 | Norton | ................ | G03B 21/2086 |
| 9,904,156 B2 * | 2/2018 | Kuroda | ................ | G03B 21/16 |
| 9,939,720 B2 | 4/2018 | Furumi | | |
| 10,281,806 B2 * | 5/2019 | Kayano | ................ | H04N 9/3141 |
| 2001/0050758 A1 * | 12/2001 | Suzuki | ................ | G02B 13/18 348/E5.142 |

(Continued)

FOREIGN PATENT DOCUMENTS

| | | |
|---|---|---|
| JP | 2016-109823 A | 6/2016 |
| JP | 2017-129725 A | 7/2017 |

(Continued)

*Primary Examiner* — Bao-Luan Q Le
(74) *Attorney, Agent, or Firm* — Oliff PLC

(57) ABSTRACT

A projection optical apparatus includes a projection system projecting light and including a resin lens, a degradation suppressor configured to suppress degradation of the resin lens, and a projection controller configured to control the degradation suppressor.

17 Claims, 11 Drawing Sheets

(56) References Cited

U.S. PATENT DOCUMENTS

| | | | | |
|---|---|---|---|---|
| 2004/0046944 A1* | 3/2004 | Suzuki | ................. | G03B 21/10 |
| | | | | 348/E5.142 |
| 2005/0083491 A1* | 4/2005 | Suzuki | ................. | G03B 21/28 |
| | | | | 348/E5.142 |
| 2006/0098294 A1* | 5/2006 | Suzuki | ................. | G02B 13/16 |
| | | | | 359/631 |
| 2007/0201009 A1* | 8/2007 | Suzuki | ................ | G02B 17/002 |
| | | | | 353/77 |
| 2012/0033187 A1* | 2/2012 | Kotani | ................. | G03B 21/16 |
| | | | | 353/121 |
| 2012/0133896 A1* | 5/2012 | Maeda | ................ | H04N 9/3194 |
| | | | | 353/20 |
| 2015/0253456 A1* | 9/2015 | Norton | ..................... | G01J 1/18 |
| | | | | 250/222.1 |
| 2016/0202386 A1* | 7/2016 | Norton | .............. | G03B 21/2086 |
| | | | | 250/222.1 |
| 2017/0205697 A1 | 7/2017 | Furumi | | |
| 2017/0242213 A1* | 8/2017 | Kuroda | ................. | G03B 21/14 |
| 2017/0242324 A1* | 8/2017 | Kuroda | ................... | H04N 5/74 |
| 2017/0363940 A1* | 12/2017 | Kayano | ................ | H04N 9/3141 |
| 2019/0025689 A1* | 1/2019 | Guan | ..................... | G03B 21/53 |
| 2021/0051305 A1* | 2/2021 | Takahashi | ................ | G09G 5/00 |
| 2021/0165308 A1* | 6/2021 | Matsuyama | ........... | G03B 21/28 |

FOREIGN PATENT DOCUMENTS

| | | |
|---|---|---|
| JP | 2019-133061 A | 8/2019 |
| JP | 2020-042103 A | 3/2020 |

* cited by examiner

PROJECTION OPTICAL APPARATUS, PROJECTOR, AND METHOD FOR PROJECTION OPTICAL APPARATUS THAT SUPPRESSES DEGREDATION OF A RESIN LENS

The present application is based on, and claims priority from JP Application Serial Number 2020-086630, filed May 18, 2020, the disclosure of which is hereby incorporated by reference herein in its entirety.

BACKGROUND

1. Technical Field

The present disclosure relates to a projection optical apparatus, a projector, and a method for controlling the projection optical apparatus.

2. Related Art

As the projection system of a projector, there is a known configuration as follows: For example, JP-A-2016-109823 discloses a lens apparatus including an optical unit formed of an image plane curvature adjustment group, a position detection section that detects the position of the optical unit, a measurement section that measures the temperature of the optical unit, and a movement section that moves the optical unit in such a way that the image plane curvature is adjusted based on the result of the measurement performed by the measurement section and the result of the detection performed by the position detection section.

In recent years, from a viewpoint of convenience at the time of lens manufacture and other viewpoints, an organic material is used in some cases as the material of a lens that forms a projection system. When a lens made of an organic material or what is called a resin lens is used, however, the optical performance of the projection system can undesirably lower due to degradation of the resin lens.

In the lens apparatus disclosed in JP-A-2016-109823, the degree of image plane curvature is reduced by detecting a change in the temperature of the optical unit and moving the optical unit along the optical axis. The lens apparatus disclosed in JP-A-2016-109823, however, is not intended to employ a resin lens and cannot therefore handle a problem of this type.

SUMMARY

To solve the problem described above, a projection optical apparatus according to an aspect of the present disclosure includes a projection system projecting light and including a resin lens, a degradation suppressor configured to suppress degradation of the resin lens, and a projection controller configured to control the degradation suppressor.

A projector according to an aspect of the present disclosure includes a light source, a light modulator modulating light emitted from the light source in accordance with image information, and the projection optical apparatus according to the aspect of the present disclosure projecting the light modulated by the light modulator.

A method for controlling a projection optical apparatus according to an aspect of the present disclosure is a method for controlling a projection optical apparatus including a projection system projecting light and including a resin lens, the method including detecting a state of degradation of the resin lens and performing a suppression operation of suppressing the degradation of the resin lens based on a detection result of the degradation state.

DESCRIPTION OF EXEMPLARY EMBODIMENTS

First Embodiment

A first embodiment of the present disclosure will be described below with reference to FIGS. 1 to 3.

In the following drawings, components are drawn at different dimensional scales in some cases for clarification of each of the components.

An example of a projector according to the present embodiment will be described.

Figure 1:
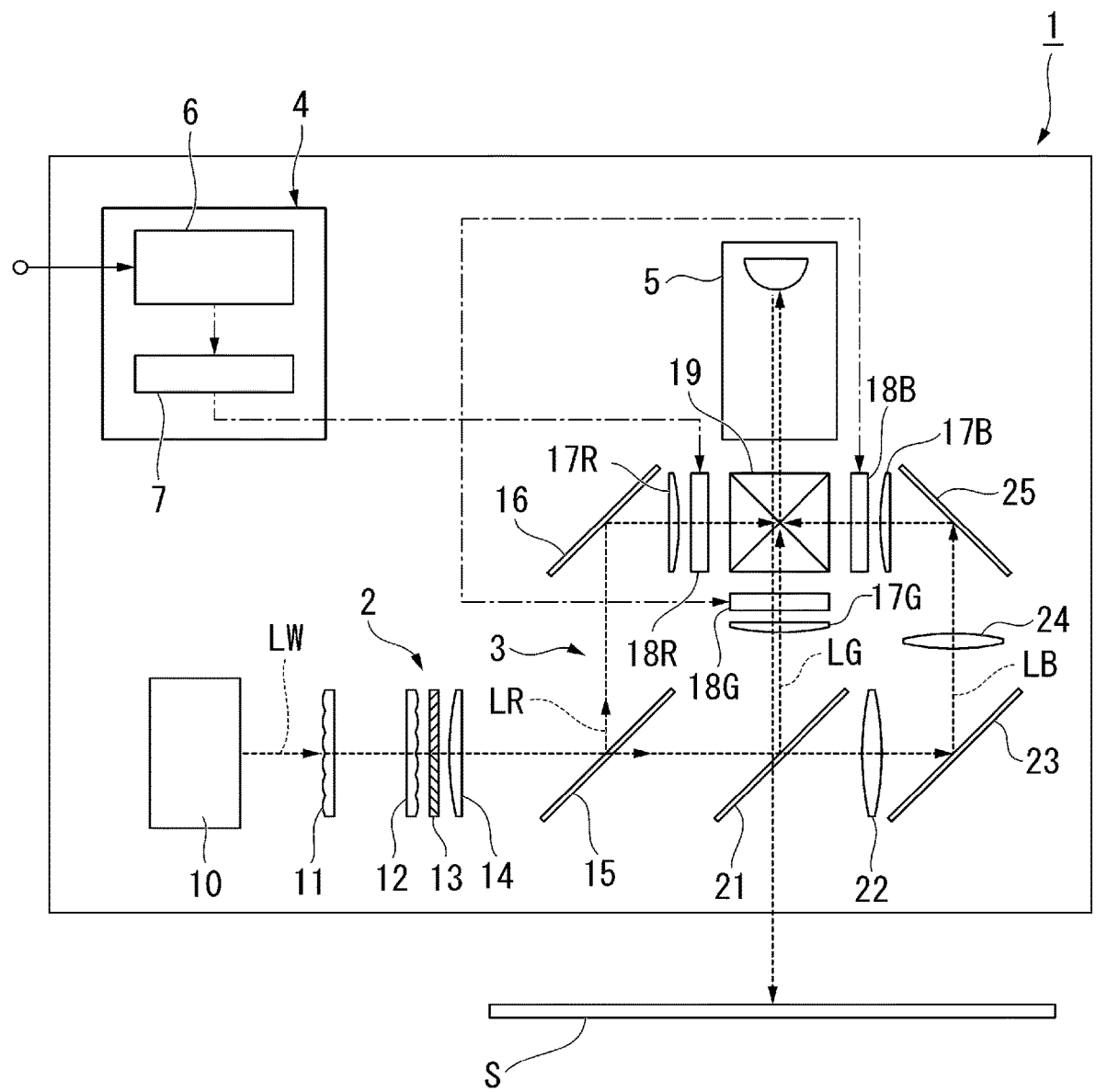
FIG. 1 is a schematic configuration diagram of a projector according to a first embodiment.

FIG. 1 is a schematic configuration diagram of a projector 1 according to the present embodiment.

The projector 1 according to the present embodiment is a projection-type image display apparatus that displays color video images on a screen SCR (projection receiving surface), as shown in FIG. 1. The projector 1 includes an illuminator 2, a color separation system 3, light modulators 18R, 18G, and 18B, a light combining system 19, a projection optical apparatus 5, and a controller 4.

The illuminator 2 includes a light source 10, a first optical integration lens 11, a second optical integration lens 12, a polarization converter 13, and a superimposing lens 14.

The light source 10 is formed, for example, of a discharge lamp, such as an ultrahigh-pressure mercury lamp, a light source including a wavelength converter, such as a phosphor, and an excitation light source, or a solid-state light source, such as a semiconductor laser. The light source 10 outputs white light LW.

The first optical integration lens 11 and the second optical integration lens 12 each include a plurality of lenses arranged in an array. The first optical integration lens 11 divides the light LW outputted from the light source 10 into a plurality of light fluxes. The lenses that form the first optical integration lens 11 focus the plurality of divided light fluxes in the vicinity of the lenses of the second optical integration lens 12.

The polarization converter 13 converts the light that exits out of the second optical integration lens 12 into linearly polarized light having a specific polarization direction. The superimposing lens 14 superimposes images of the lenses of the first optical integration lens 11 on one another in an image formation area of liquid crystal panels that form the light modulators 18R, 18G, and 18B via the second optical integration lens 12.

The color separation system 3 includes a first dichroic mirror 15, a second dichroic mirror 21, a first reflection mirror 16, a second reflection mirror 23, a third reflection mirror 25, a first relay lens 22, and a second relay lens 24. The color separation system 3 separates the light LW outputted from the illuminator 2 into red light LR, green light LG, and blue light LB, guides the red light LR to the light modulator 18R, guides the green light LG to the light modulator 18G, and guides the blue light LB to the light modulator 18B.

A field lens 17R is disposed between the color separation system 3 and the light modulator 18R, substantially parallelizes incident light, and causes the resultant light to travel toward the light modulator 18R. A field lens 17G is disposed between the color separation system 3 and the light modulator 18G, substantially parallelizes incident light, and causes the resultant light to travel toward the light modulator 18G. A field lens 17B is disposed between the color separation system 3 and the light modulator 18B, substantially parallelizes incident light, and causes the resultant light to travel toward the light modulator 18B.

The first dichroic mirror 15 reflects a red light component and transmits a green light component and a blue light component. The second dichroic mirror 21 reflects the green light component and transmits the blue light component. The reflection mirror 16 reflects the red light component. The second reflection mirror 23 and the third reflection mirror 25 reflect the blue color component.

The red light LR reflected off the first dichroic mirror 15 is reflected off the first reflection mirror 16, passes through the field lens 17R, and is incident on the image formation area of the light modulator 18R for red light. The green light LG having passed through the first dichroic mirror 15 is reflected off the second dichroic mirror 21, passes through the field lens 17G, and is incident on the image formation area of the light modulator 18G for green light. The blue light LB having passed through the second dichroic mirror 21 travels via the first relay lens 22, the second reflection mirror 23, the second relay lens 24, the third reflection mirror 25, and the field lens 17B and is incident on the image formation area of the light modulator 18B for blue light.

The light modulators 18R, 18G, and 18B each modulate the color light incident thereon in accordance with image information to form image light. The light modulators 18R, 18G, and 18B each include a liquid crystal panel. Although not shown, a light-incident-side polarizer is disposed on the light incident side of each of the light modulators 18R, 18G, and 18B. A light-exiting-side polarizer is disposed on the light exiting side of each of the liquid crystal panels.

The light combining system 19 combines the image light outputted from the light modulator 18R, the image light outputted from the light modulator 18G, and the image light outputted from the light modulator 18B with one another to form full-color image light. The light combining system 19 is formed of a cross dichroic prism formed of four right angled prisms bonded to each other and having a substantially square shape in a plan view. Dielectric multilayer films are formed along the substantially X-letter-shaped interfaces between the right angled prisms bonded to each other.

The image light having exited out of the light combining system 19 is enlarged and projected on the screen S by the projection optical apparatus 5. That is, the projection optical apparatus 5 projects the light modulated by the light modulators 18R, 18G, and 18B on the screen S.

The controller 4 includes an image processor 6 and a display driver 7. An external image signal, such as a video signal, is inputted to the image processor 6. The display driver 7 drives the light modulators 18R, 18G, and 18B based on image signals outputted from the image processor 6.

The image processor 6 converts the external image signal, such as a video signal, which is inputted from an external apparatus, into image information containing grayscales and other factors of the corresponding color. The display driver 7 operates the light modulators 18R, 18G, and 18B based on the image information outputted from the image processor 6. The controller 4 thus causes the light modulators 18R, 18G, and 18B to generate color image light that forms a projection image corresponding to the image information.

The configuration of the projection optical apparatus 5 will be described below.

Figure 2:
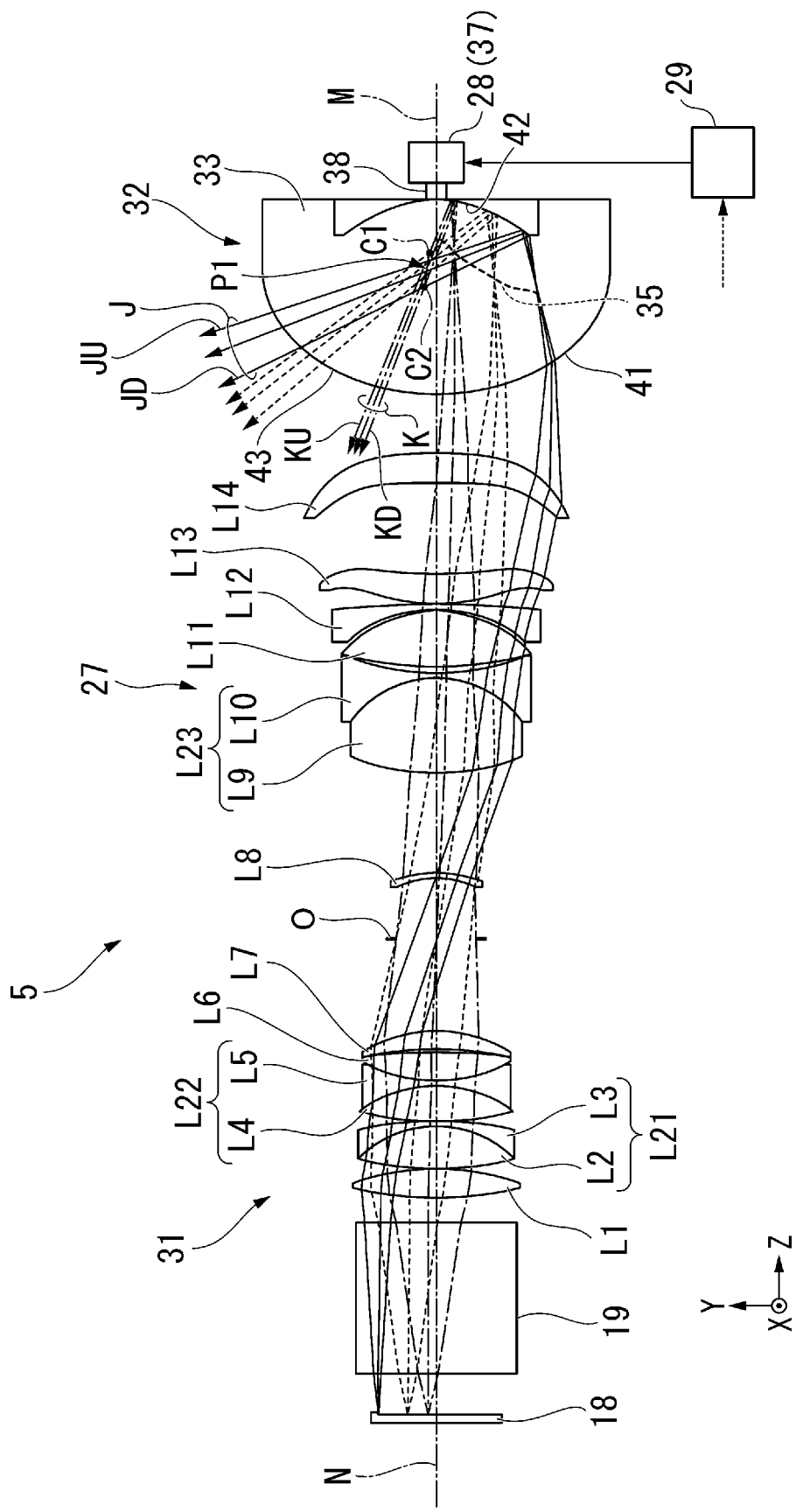
FIG. 2 is a schematic configuration diagram of a projection optical apparatus according to the first embodiment.

FIG. 2 is a schematic configuration diagram of the projection optical apparatus 5 according to the present embodiment. The light modulators 18R, 18G, and 18B have the same configuration and are therefore called light modulators 18 in FIG. 2. The screen S is not shown in FIG. 2.

The projection optical apparatus 5 includes at least one resin lens and further includes a projection system 27, which projects a projection image on the screen S, a degradation suppressor 28, which suppresses degradation of a first optical element 33, which will be described later, and a projection controller 29, which controls the degradation suppressor 28, as shown in FIG. 2.

The projection system 27 is formed of two optical systems each including a plurality of lenses. Specifically, the projection optical apparatus 5 includes a first optical system 31 and a second optical system 32 sequentially arranged from the demagnifying side toward the magnifying side. The projection optical apparatus 5 according to the present embodiment allows wide-angel projection. That is, in the projection optical apparatus 5, the angle between a light flux that reaches a minimum image height position and a light flux that reaches a maximum image height position, what is called a projection angle, is wide.

The first optical system 31 is a refractive optical system including a plurality of lenses. The second optical system 32 is formed of a first optical system element 33 formed of a reflective lens. That is, the projection optical apparatus 5 according to the present embodiment is formed of a reflective/refractive projection optical apparatus.

The first optical element 33 has a first light incident surface 41, a first reflection surface 42, and a first light exiting surface 43 sequentially arranged from the demagnifying side. The first light incident surface 41 has a convex shape protruding toward the demagnifying side. The first reflection surface 42 has a concave shape. The first light exiting surface 43 has a convex shape protruding toward the magnifying side. The first optical element 33, which forms the second optical system 32, is disposed on a first optical axis N1 of the first optical system 31. In the present embodiment, the first optical axis N of the first optical system coincides with a second optical axis M of the first reflection surface 42 of the first optical element 33, and the straight line formed of the first optical axis N and the second optical axis M forms the optical axis of the projection system 27.

The light modulators 18 are disposed in the demagnifying-side image formation plane of the projection optical apparatus 5. The light modulators 18 form projection images on one side of the first optical axis N1 of the first optical system 31 in a plane perpendicular to the first optical axis N. The screen S is disposed in the magnifying-side image formation plane of the projection optical apparatus 5. An intermediate image 35, which is conjugate with the demagnifying-side image formation plane, is formed between the first optical system 31 and the first reflection surface 42 of the first optical element 33. The intermediate image 35 is conjugate also with the magnifying-side image formation plane. In the present embodiment, the intermediate image 35 is formed inside the first optical element 33. That is, the intermediate image 35 is formed between the first light incident surface 41 and the first reflection surface 42 of the first optical element 33.

In the following description, three axes perpendicular to one another are called axes X, Y, and Z for convenience of the description. The width direction of the screen S, which is the magnifying-side image formation plane, is called an axis-X direction, the upward/downward direction of the screen S is called an axis-Y direction, and the direction perpendicular to the screen S is called an axis-Z direction. A plane containing the first optical axis N of the first optical system 31 and the second optical axis M of the first reflection surface 42 of the first optical element is called a plane YZ.

In the present embodiment, the first optical axis N of the first optical system 31 and the second optical axis M of the first reflection surface 42 of the first optical element 33 extend in the axis-Z direction. FIG. 2 is therefore a light ray diagram in the plane YZ. The light modulators 18 form the projection images on an upper side of the first optical axis N of the first optical system 31.

The first optical system 31 includes 14 lenses L1 to L14. The lenses L1 to L14 are arranged in the presented order from the demagnifying side toward the magnifying side. In the present embodiment, the lenses L2 and L3 are bonded to each other into a first doublet L21. The lenses L4 and L5 are bonded to each other into a second doublet L22. The lenses L9 and L10 are bonded to each other into a third doublet L23. An aperture O is disposed between the lens L7 and the lens L8.

The first optical element 33 is designed by using the second optical axis M of the first reflection surface 42 as the axis in the design stage. In other words, the second optical axis M is the design-stage optical axis of the first light incident surface 41, the first light exiting surface 43, and the first reflection surface 42. The first light incident surface 41 and the first reflection surface 42 are located on the lower side of the second optical axis M of the first reflection surface 42, and the first light exiting surface 43 is located on the upper side of the second optical axis M of the first reflection surface 42. The first optical element 33 is rotatably supported by an arbitrary support mechanism that is not shown.

In the present embodiment, the first light incident surface 41, the first reflection surface 42, and the first light exiting surface 43 of the first optical element 33 are each an aspheric surface. The planes containing the first light incident surface 41, the first reflection surface 42, and the first light exiting surface 43 each have a shape rotationally symmetric around the second optical axis M of the first reflection surface 42 as the rotation axis. The first light incident surface 41 and the first light exiting surface 43 therefore form a rotationally symmetric shape. The first reflection surface 42 is formed of a reflection coating layer provided on a surface of the first optical element 33 that is the opposite surface from the first light incident surface 41. The aspheric surfaces may each be a free-form surface. Also in this case, the free-form surfaces are designed by using the second optical axis M as the design-stage axis.

In the present embodiment, the first optical system 33, which forms the second optical system 32, is formed of a resin lens. The first optical element 33 in the present embodiment therefore corresponds to the resin lens in the claims. On the other hand, the 14 lenses L1 to L14, which form the first optical system 31, are each formed of a glass lens. It is noted that at least part of the 14 lenses L1 to L14 may each be formed of a resin lens. That is, the projection system 27 includes at least one resin lens.

When the projector 1 is used and if the first optical element 33 is not rotated, heat is locally generated in some cases at a high-optical-density location in the first optical element 33. In the present embodiment, the high-optical-density location may, for example, be an exit pupil P1 of the second optical system 32, and the exit pupil P1 is formed in the first optical system 33. In FIG. 2, the exit pupil P1 is defined as the location where an intersection C1 of an uppermost light ray JU of an upper end light flux J and an uppermost light ray KU of a lower end light flux K is connected to an intersection C2 of a lowermost light ray JD of the upper end light flux J and a lowermost light ray KD of the lower end light flux K. In this case, when the projector 1 is used and if the first optical element 33 is not rotated, the light concentrates at the exit pupil P1 in the first optical element 33 and a region around the exit pupil P1, and heat is locally generated in some cases.

The degradation suppressor 28 is formed of a rotation driver 37, which rotates the first optical element 33 around a rotation axis along the second optical axis M of the first reflection surface 42, that is, the optical axis of the projection system 27. Specifically, the rotation driver 37 is formed, for example, of a motor. The form of the motor is not limited to a specific form. The rotation driver 37 has a rotary shaft 38 along the second optical axis M of the first reflection surface 42, and the first optical element 33 is bonded to the rotary shaft 38. As a specific bonding form, for example, the first optical element 33 may be bonded to the rotary shaft 38 via a base member that is not shown. The first optical element 33, which has a rotationally symmetric shape as described above, is so bonded to the rotary shaft 38 that the center axis of the rotationally symmetric shape is coaxial with the rotary shaft 38. The rotation driver 37 is disposed on the opposite side from the first light incident surface 41 and the first light exiting surface 43 with respect to the first reflection surface 42. In the present embodiment, since the first optical element 33 is a reflective/refractive optical element, the arrangement in which the rotation driver 37 is disposed on the second optical axis M causes no optical problem as along as the rotation driver 37 is disposed on the opposite side from the first light incident surface 41 and the first light exiting surface 43. The rotation driver 37 rotates the first optical element 33 at a predetermined speed when the projector 1 is powered on.

The projection controller 29 controls the rotation driver 37, which forms the degradation suppressor 28 in the present embodiment. The projection controller 29 is formed, for example, of a CPU (central processing unit) provided on a control substrate of the projection optical apparatus 5 and carries out a variety of processes shown below. The projector controller 29 may instead be provided in the controller 4 of the projector 1. The action of the projection controller 29 will next be described.

A method for controlling the projection optical apparatus 5 according to the present embodiment will be described below.

Figure 3:
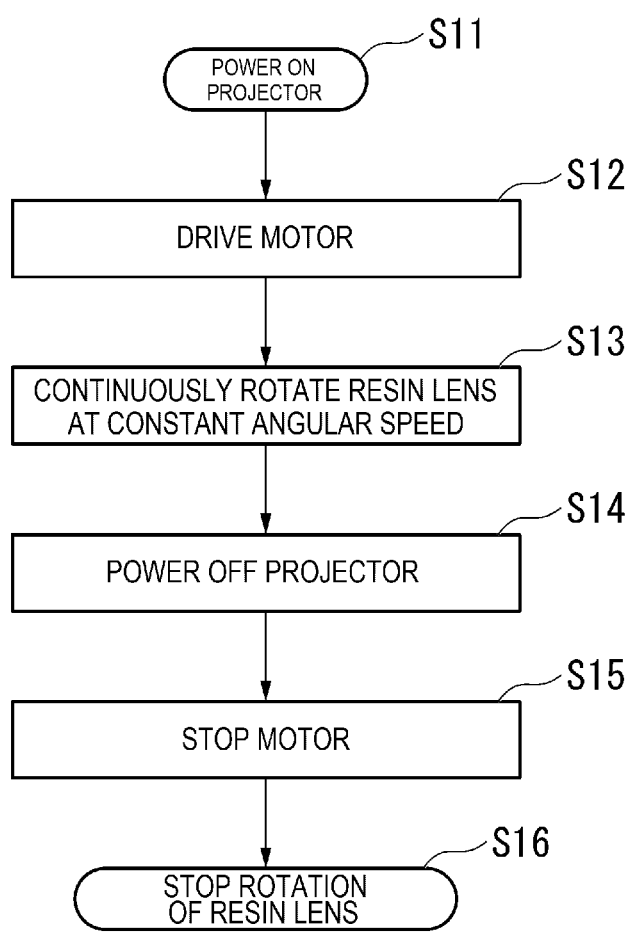
FIG. 3 is a flowchart showing a method for controlling the projection optical apparatus according to the first embodiment.

FIG. 3 is a flowchart showing the method for controlling the projection optical apparatus 5 according to the present embodiment.

First, to start using the projector 1, a user powers on the projector 1 (step S11).

The projection controller 29 then receives a power-on signal from the controller 4 and outputs a drive signal to the rotation driver 37 to drive the motor (step S12).

In this process, the first optical element 33 is continuously rotated at a predetermined speed, specifically, at a fixed angular speed (step S13). In the present embodiment, the first optical element 33 is configured to keep rotating as long as the projector 1 is used. An increase in the temperature of the first optical element 33 is thus suppressed, whereby degradation thereof is suppressed.

Thereafter, to stop using the projector 1, the user powers off the projector 1 (step S14).

The projection controller 29 then receives a power-off signal from the controller 4 and stops outputting the drive signal to the rotation driver 37 to stop the motor (step S15).

The first optical element 33 thus stops rotating (step S16).

As described above, in the projection optical apparatus 5 according to the present embodiment, the first light incident surface 41, the first reflection surface 42, and the first light exiting surface 43 of the first optical element 33 are each an aspheric surface. When the projection optical apparatus 5 uses an aspheric lens of this type, an organic material is used in some cases as the material of the aspheric lens because the lens can be readily manufactured, for example, by using a die to form an aspheric shape. A resin lens made of an organic material, however, can be degraded as a projector outputs a higher luminous flux or a light source outputs higher luminance light. No method for suppressing degradation of a resin lens has, however, been provided.

The present inventor has intensively conducted studies on causes of the degradation of a resin lens and found that when a resin lens is used, for example, as the first optical element 33 in the present embodiment, a high optical density location, such as the exit pupil P1, occurs in the first optical element 33, and local heat generated at the high optical density location and in the vicinity thereof leads to the degradation of the resin lens.

In view of the findings described above, in the projection optical apparatus 5 according to the present embodiment, the rotation driver 37 rotates the first optical element 33 at a constant angular speed when the projector 1 is used, so that the position of the exit pupil P1 moves along the circumferential direction around the rotary shaft 38 with time. The optical intensity distribution in the first optical element 33 is therefore homogenized in the circumferential direction, whereby an abrupt temperature increase due to the local heat generation in the first optical element 33 is suppressed. The projection optical apparatus 5 according to the present embodiment thus allows suppression of the degradation of the first optical element 33, whereby a decrease in the optical performance of the projection optical apparatus 5 resulting from the degradation of the first optical element 33 can be suppressed. Since the first optical element 33 has a rotationally symmetric shape around the rotary shaft 38, rotating the first optical element 33 when the projector 1 is used hardly affects the optical performance of the projection optical apparatus 5.

Further, since the projection optical apparatus 5 according to the present embodiment is configured to keep rotating the first optical element 33 when the projector 1 is used, no detector for detecting the state of degradation of the first optical element 33 is required. The projection optical apparatus 5 according to the present embodiment having the simple apparatus configuration thus allows suppression of a decrease in the optical performance thereof resulting from the degradation of the first optical element 33 without the user's special operation.

The projector 1 according to the present embodiment, which includes the projection optical apparatus 5 described above, excels in projection performance.

Second Embodiment

A second embodiment of the present disclosure will be described below with reference to FIGS. 4 and 5.

The configuration of the projector according to the second embodiment is the same as that in the first embodiment but differs therefrom in terms of the configuration of the projection optical apparatus. The overall configuration of the projector is therefore not described.

Figure 4:
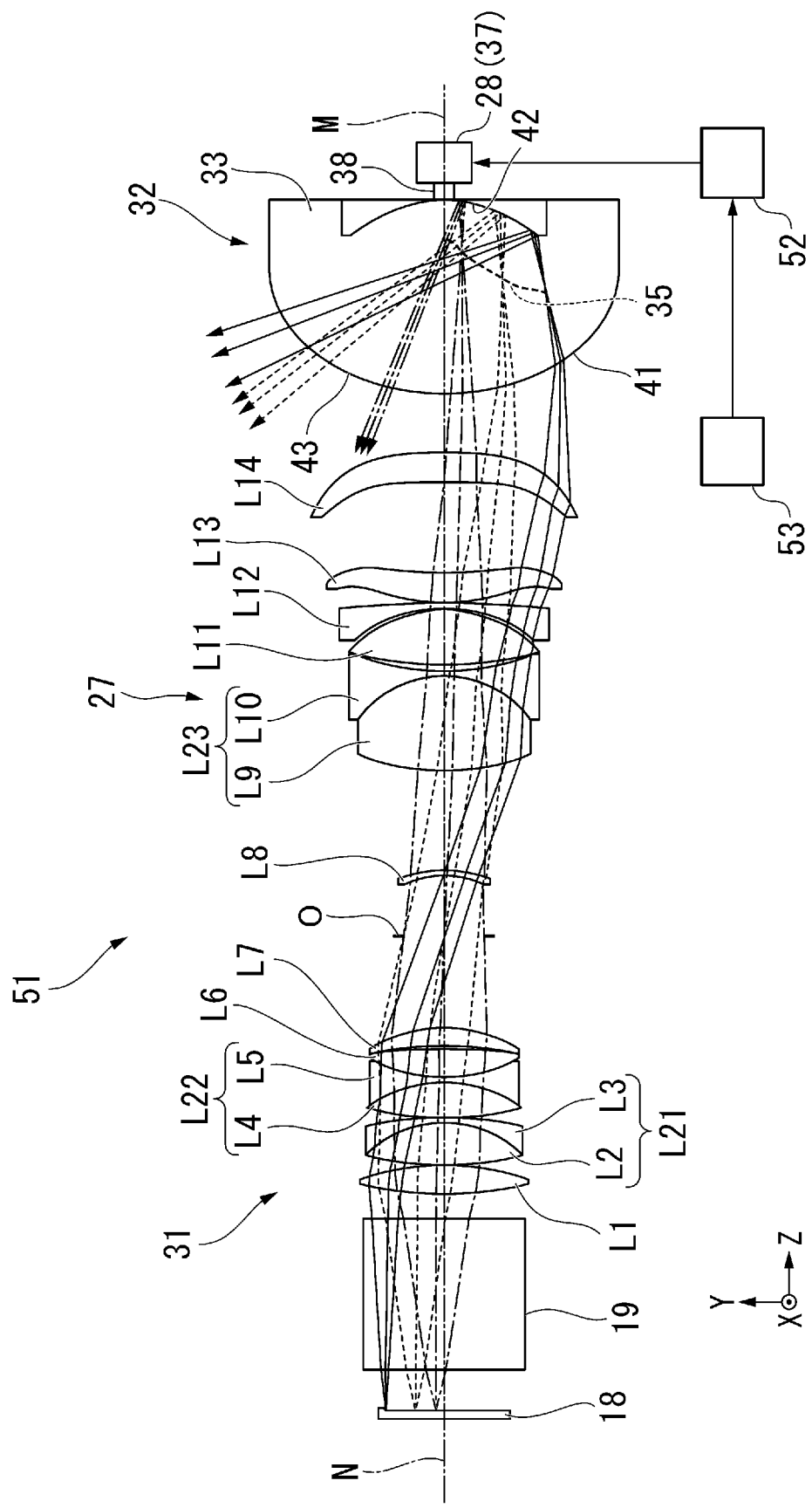
FIG. 4 is a schematic configuration diagram of the projection optical apparatus according to a second embodiment.

FIG. 4 is a schematic configuration diagram of a projection optical apparatus 51 according to the second embodiment.

In FIG. 4, components common to those in the figures used in the first embodiment have the same reference characters and will not be described.

The projection optical apparatus 51 according to the present embodiment includes the projection system 27, which projects a projection image on the screen S, the degradation suppressor 28, which suppresses degradation of the first optical element 33, a projection controller 52, which controls the degradation suppressor 28 based on the result of the detection performed by a detector 53, and the detector 53, which detects the state of the degradation of the first optical element 33, as shown in FIG. 4.

The detector 53 can be any of detectors having a variety of forms shown below.

A detector of a first example includes an imager that captures an image of a projection image projected on the screen S. The imager can, for example, be an imaging device, such as a CCD camera. In this case, the projection controller 52 can detect the state of the degradation of the first optical element 33, for example, by accumulating an integrated value of information on the luminance of the projection image projected on the screen S and captured by the imager. The projection controller 52 controls the degradation suppressor 28 based on the information on the luminance of the projection image projected on the screen S and captured by the imager.

A detector of a second example includes a temperature detector that detects the temperature of the first optical element 33. The temperature detector can, for example, be a noncontact temperature sensor using infrared light. In this case, the projection controller 52 can detect the state of the degradation of the first optical element 33 from a measured temperature of the first optical element 33 detected by the temperature detector. In this process, the projection controller 52 may detect the degradation state from the temperature measured in the current single operation of the projector 1 or from a measured temperature in consideration of the history of temperature changes for the period from the shipment of the projector 1 to the present. The projection controller 52 controls the degradation suppressor 28 based on information on the temperature of the first optical element 33 detected by the temperature detector.

A detector of a third example includes a leakage light detector that detects light that leaks from the first optical element 33. The leakage light detector can, for example, be a photosensor. A resin lens is characterized in that the intensity of light that leaks therefrom increases as the degradation thereof advances. The projection controller 52 can therefore detect the state of the degradation of the first optical element 33 based on the intensity of the leakage light detected with the photosensor. The projection controller 52 controls the degradation suppressor 28 based on information on the intensity of the leakage light detected by the leakage light detector.

A detector of a fourth example includes a thickness detector that detects the thickness of the first optical element 33 in the optical axis direction thereof. The thickness detector can, for example, be a noncontact displacement sensor. A resin lens is characterized in that the thickness thereof in the optical axis direction tends to increase when the temperature thereof increases as the period for which the resin lens is used increases. The projection controller 52 can therefore detect the state of the degradation of the first optical element 33 based on changes in the positions of the first light incident surface 41 and the first light exiting surface 43 of the first optical element 33 detected with the displacement sensor. The projection controller 52 controls the degradation suppressor 28 based on information on the thickness of the first optical element 33 detected by the thickness detector. The detector may instead detect a change in the position of the first reflection surface 42 and detects the state of the degradation of the first optical element 33 based on the change in the position of the first reflection surface 42.

A detector of a fifth example includes a light emission period detector that detects the light emission period for which the light source 10 of the projector 1 keeps emitting light. The light emission period detector may detect an accumulated light emission period starting from the time of shipment of the projector 1 as an initial value or may detect an in-use light emission period starting from the operation start time in the current single operation of the projector 1 as an initial value. The projection controller 52 controls the degradation suppressor 28 based on information on the light emission period detected by the light emission period detector.

A detector of a sixth example includes a luminescence intensity detector that detects the intensity of the light emitted from the light source 10 of the projector 1. The luminescence intensity detector can grasp the intensity of the light to which the first optical element 33 has been exposed by detecting the integrated value of the intensity of the light emitted from the light source 10 and can therefore detect the state of the degradation of the first optical element 33. The projection controller 52 controls the degradation suppressor 28 based on information on the luminescence intensity detected by the luminescence intensity detector.

A detector of a seventh example includes a luminance information detector that detects luminance information provided from the image information held in the controller 4. The luminance information detector can detect the state of the degradation of the first optical element 33 by detecting an integrated value of the luminance provided from the image information. The projection controller 52 controls the degradation suppressor 28 based on the luminance information detected by the luminance information detector.

The degradation suppressor 28 is formed of the rotation driver 37, which rotates the first optical element 33, as in the first embodiment. The projection controller 52 in the present embodiment controls the degradation suppressor 28 based on the result of the detection of the state of the degradation of the first optical element 33 performed by the detector 53, as described above.

The action of the degradation suppressor 28 in the present embodiment, however, differs from that in the first embodiment. That is, the projector 1 according to the first embodiment includes no detector 53 and causes the first optical element 33 to continuously rotate after the projector 1 is powered on, whereas the projector according to the present embodiment includes the detector 53 and causes the first optical element 33 to rotate by a predetermined angle when the result of the detection performed by the detector 53 exceeds a predetermined threshold.

The other configurations of the projection optical apparatus 51 are the same as those of the projection optical apparatus 5 according to the first embodiment.

A method for controlling the projection optical apparatus 51 according to the present embodiment will be described below.

Figure 5:
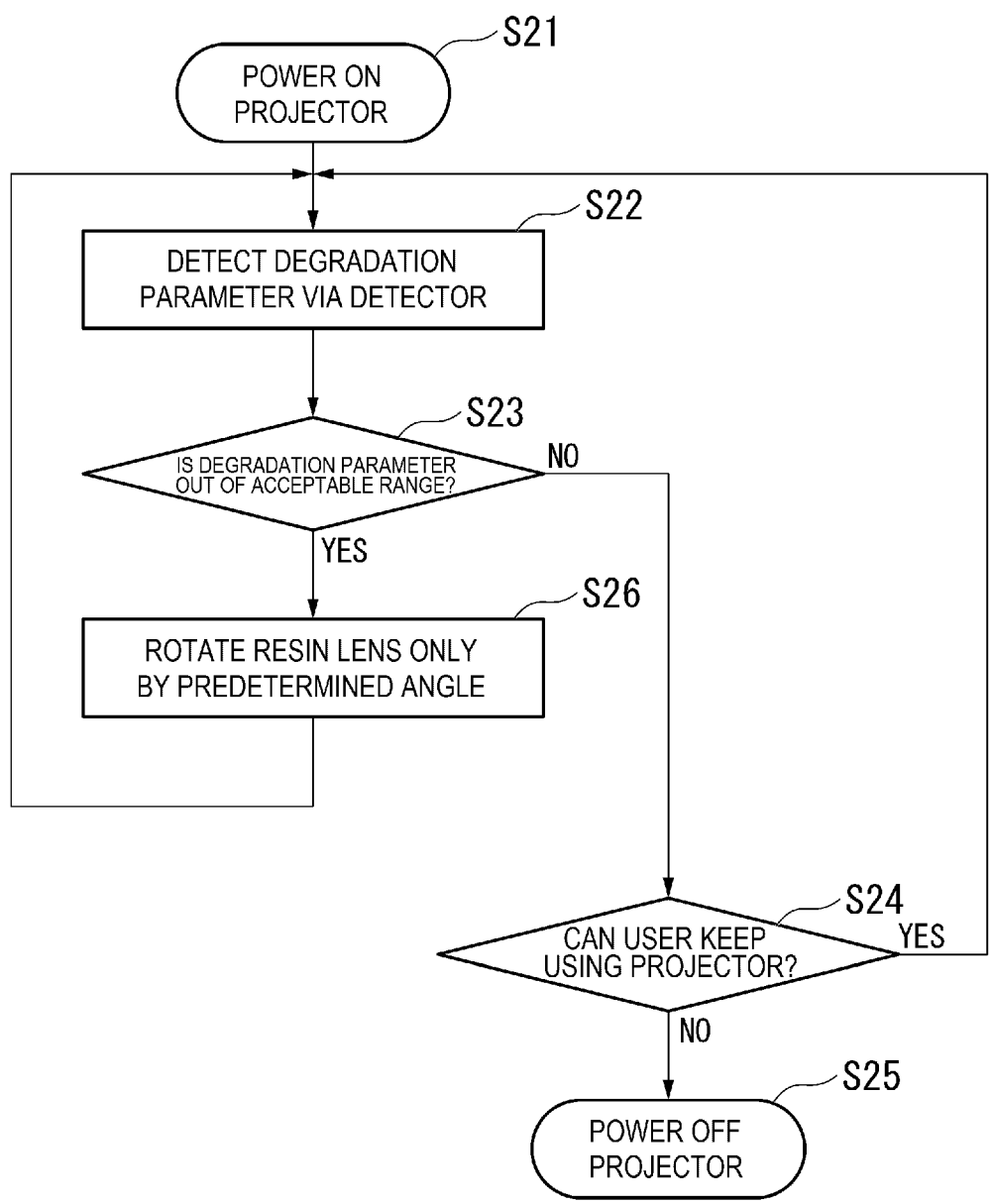
FIG. 5 is a flowchart showing a method for controlling the projection optical apparatus according to the second embodiment.

FIG. 5 is a flowchart showing the method for controlling the projection optical apparatus 51 according to the present embodiment.

First, to start using the projector, the user powers on the projector 1 (step S21).

The detector 53 then uses any of the variety of methods described above to detect a degradation parameter of the first optical element 33 (step S22). The degradation parameter is a detection item showing the state of the degradation of the first optical element 33 detected by any of the detectors of the first to seventh examples described above.

Specifically, in the case of the detector of the first example, the information on the luminance of a projection image on the screen S corresponds to the degradation parameter. In the case of the detector of the second example, a measured temperature of the first optical element 33 detected by the temperature detector corresponds to the degradation parameter. In the case of the detector of the third example, the intensity of the leakage light detected with the photosensor corresponds to the degradation parameter. In the case of the detector of the fourth example, the information on the thickness of the first optical element 33 detected by the thickness detector corresponds to the degradation parameter. In the case of the detector of the fifth example, the light emission period detected by the light emission period detector corresponds to the degradation parameter. In the case of the detector of the sixth example, the intensity of the light emitted from the light source and detected by the luminescence intensity detector corresponds to the degradation parameter. In the case of the detector of the seventh example, the luminance information provided from the image information and detected by the luminance information detector corresponds to the degradation parameter.

The projection controller 52 then evaluates whether or not the degradation parameter provided from the detector 53 exceeds a predetermined threshold, that is, whether or not the degradation parameter is out of an acceptable range (step S23).

When the result of the evaluation shows that the degradation parameter falls within the acceptable range (No in step S23), the projection controller 52 evaluates whether or not to keep using the projector (step S24).

When it is determined to keep using the projector (Yes in step S24), the detector 53 detects the degradation parameter again after a predetermined period elapses. On the other hand, when it is determined not to keep using the projector (No in step S24), the projector is powered off (step S25).

On the other hand, when the degradation parameter is out of the acceptable range (Yes in step S23), the projection controller 52 outputs the drive signal to the rotation driver 37 to drive the motor and rotates the first optical element 33 by the predetermined angle (step S26). Specifically, the projection controller 52 causes the first optical element 33 to rotate, for example, by 90° around the rotary shaft 38.

The degradation parameter is then temporarily initialized, and the user keeps using the projector.

Thereafter, when the predetermined period elapses, the detector 53 detects the degradation parameter again.

The projection controller 52 therefore stores the threshold in advance and repeats the action of rotating the first optical element 33 by the predetermined angle, for example, 90° when the degradation parameter detected by the detector 53 exceeds the threshold, then temporarily initializing the degradation parameter and allowing the user to keep using the projector, and further rotating the first optical element 33 by 90° when the degradation parameter detected by the detector 53 exceeds the threshold again. The projection controller 52 may store a plurality of thresholds in advance. In this case, the projection controller 52 may repeat the action of rotating the first optical element 33 by the predetermined angle, for example, 90° when the degradation parameter detected by the detector 53 exceeds a first threshold, then allowing the user to keep using the projector in the same state, and further rotating the first optical element 33 by 90° when the result of the detection performed by the detector 53 exceeds a second threshold.

That is, the method for controlling the projection optical apparatus 51 according to the present embodiment is a method for controlling the projection optical apparatus 51 including the projection system 27, which includes at least one resin lens and projects a projection image on the screen S, and the method includes detecting the state of the degradation of the first optical element 33 formed of the resin lens and performing the action of suppressing the degradation of the first optical element 33 formed of the resin lens based on the result of the detection of the degradation state. As the operation of suppressing the degradation of the first optical element 33, the first optical element 33 is rotated by the predetermined angle when the detection result exceeds the predetermined threshold.

In the projection optical apparatus 51 according to the present embodiment, since the rotation driver 37 rotates the first optical element 33 by the predetermined angle when the degradation parameter detected by the detector 53 exceeds the predetermined threshold, the position of the exit pupil P1 moves with time along the circumferential direction around the rotary shaft 38. The optical intensity distribution in the first optical element 33 is therefore homogenized in the circumferential direction, whereby an abrupt temperature increase due to local heat generated in the first optical element 33 is suppressed. The projection optical apparatus 51 according to the present embodiment can therefore provide the same effect as that provided in the first embodiment, for example, can suppress a decrease in the optical performance thereof resulting from the degradation of the first optical element 33.

Further, in the projection optical apparatus 51 according to the present embodiment, the detector 53 automatically detects the state of the degradation of the first optical element 33, whereby a decrease in the optical performance of the projection optical apparatus 51 resulting from the degradation of the first optical element 33 can be suppressed without the user's special operation.

Using the imager as the detector can provide an inexpensive, simple detection method for detecting the state of the degradation of the first optical element 33. In particular, a projector equipped with a built-in camera allows the existing configuration to which no new part for detection is added to suppress a decrease in the optical performance of the projection optical apparatus 51 resulting from the degradation of the first optical element 33.

When the temperature detector is used as the detector, the temperature of the first optical element 33, which affects the projection performance by the largest degree, can be directly detected, whereby a decrease in the optical performance of the projection optical apparatus 51 resulting from the degradation of the first optical element 33 can be properly suppressed.

Using the leakage light detector as the detector is effective when the projection system is a reflective/refractive optical system and provides an inexpensive method for detecting the state of the degradation of the first optical element 33.

Using the thickness detector as the detector allows direct detection of the deformation of the first optical element 33 and therefore allows enhanced safety in the use of the projector.

Using the light emission period detector as the detector provides a simple method for detecting the state of the degradation of the first optical element 33 and requires no calculation cost. When the method for detecting the light emission period starting from the operation start time in the current single operation of the projector as an initial value, in particular, the safety in the continuous use of the projector is enhanced.

Using the luminescence intensity detector as the detector can provide a proper, simple method for detecting the state of the degradation of the first optical element 33.

Using the luminance information detector as the detector provides a simple, proper method for detecting the state of the degradation of the first optical element 33 because the image information originally held by the controller 4 only needs to be processed.

The projector according to the present embodiment, which includes the projection optical apparatus 51 described above, excels in projection performance.

3. Third Embodiment

A third embodiment of the present disclosure will be described below with reference to FIGS. 6 and 7.

The configuration of the projector according to the third embodiment is the same as that in the first embodiment but differs therefrom in terms of the configuration of the projection optical apparatus. The overall configuration of the projector is therefore not described.

Figure 6:
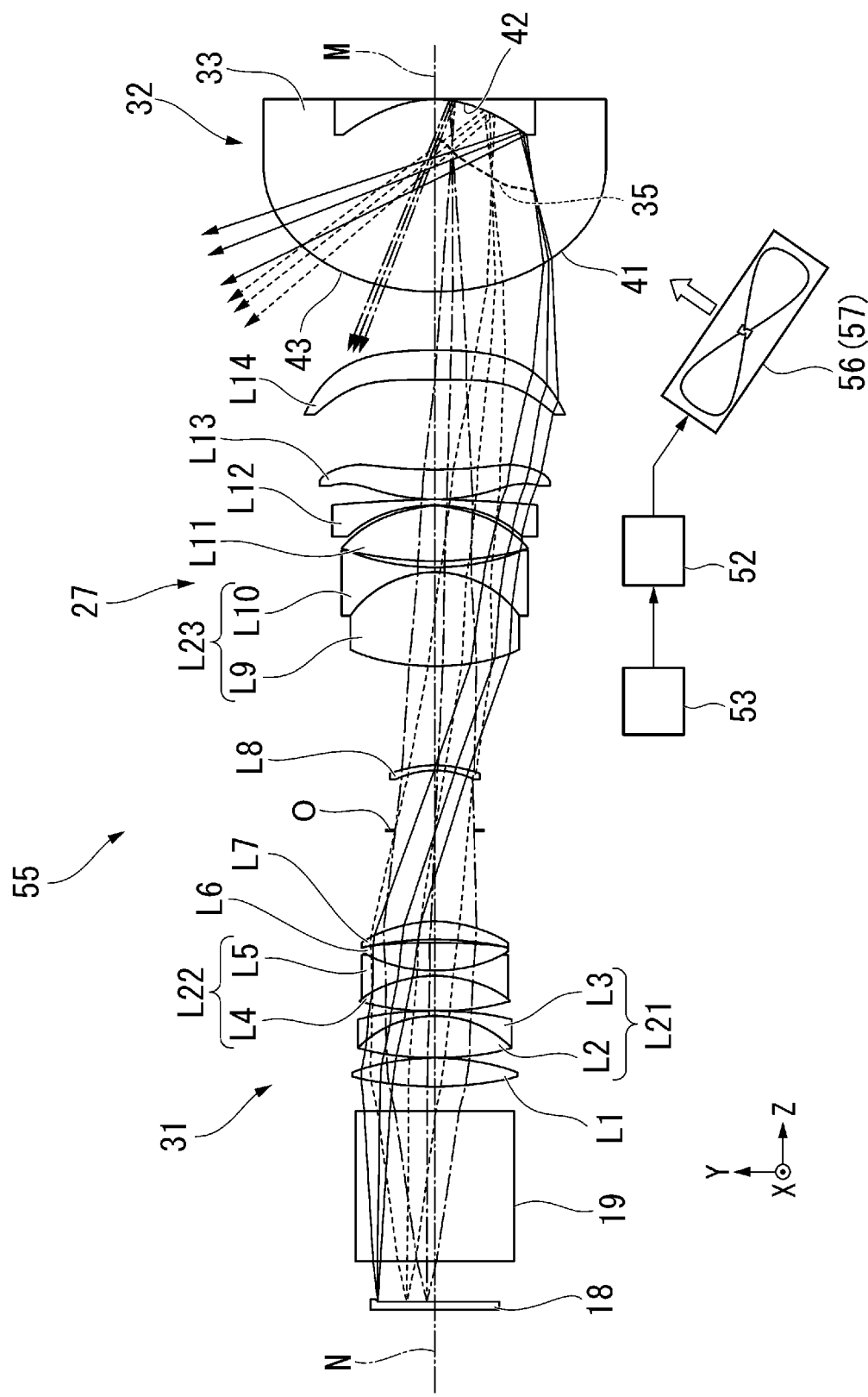
FIG. 6 is a schematic configuration diagram of the projection optical apparatus according to a third embodiment.

FIG. 6 is a schematic configuration diagram of a projection optical apparatus 55 according to the third embodiment.

In FIG. 6, components common to those in the figures used in the first embodiment have the same reference characters and will not be described.

The projection optical apparatus 55 according to the present embodiment includes the projection system 27, which projects a projection image on the screen S, a degradation suppressor 56, which suppresses degradation of the first optical element 33, the projection controller 52, which controls the degradation suppressor 56, and the detector 53, which detects the state of the degradation of the first optical element 33, as shown in FIG. 6.

The degradation suppressor 56 is formed of a cooler 57, which cools the first optical element 53. The cooler 57 can, for example, be a fan that cools the first optical element 33 based on air cooling. The cooler 57 may instead be a cooling device, such as a thermoelectric device, or may be based on liquid cooling.

The detector 53 can be any of the variety of detectors presented in the second embodiment by way of example. The projection controller 52 controls the degradation suppressor 56 based on the result of the detection of the state of the degradation of the first optical element 33 performed by the detector 53.

The other configurations of the projection optical apparatus 55 are the same as those of the projection optical apparatus 5 according to the first embodiment.

A method for controlling the projection optical apparatus 55 according to the present embodiment will be described below.

Figure 7:
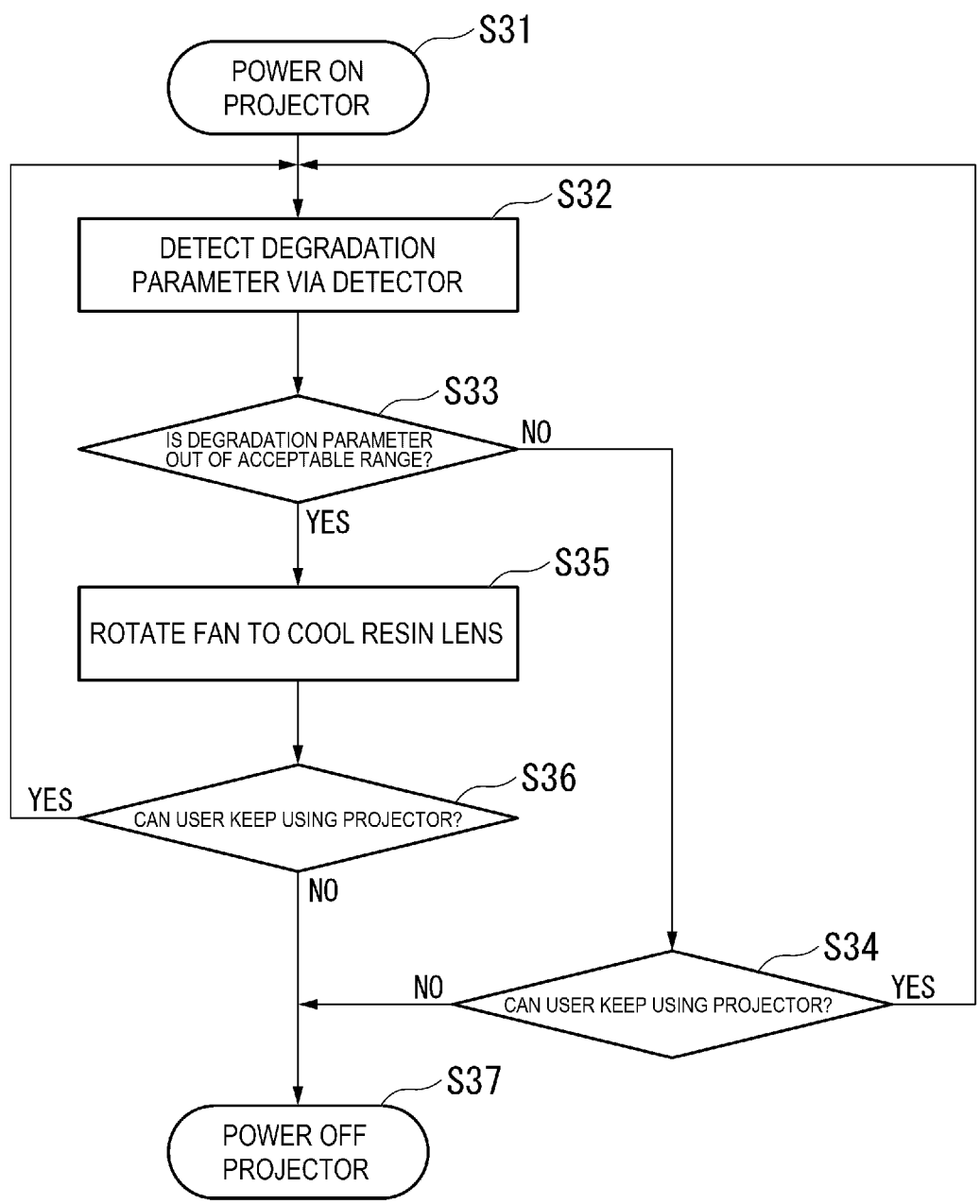
FIG. 7 is a flowchart showing a method for controlling the projection optical apparatus according to the third embodiment.

FIG. 7 is a flowchart showing the method for controlling the projection optical apparatus 55 according to the present embodiment.

First, to start using the projector, the user powers on the projector (step S31).

The detector 53 then uses any of the variety of methods described above to detect the degradation parameter of the first optical element 33 (step S32).

The projection controller 52 then evaluates whether or not the degradation parameter as the result of the detection performed by the detector 53 exceeds the predetermined threshold, that is, whether or not the degradation parameter is out of the acceptable range (step S33).

When the result of the evaluation shows that the degradation parameter falls within the acceptable range (No in step S33), the projection controller 52 evaluates whether or not to keep using the projector (step S34).

When it is determined to keep using the projector (Yes in step S34), the detector 53 detects the degradation parameter again after the predetermined period elapses. On the other hand, when it is determined not to keep using the projector (No in step S34), the projector is powered off (step S37).

On the other hand, when the degradation parameter is out of the acceptable range (Yes in step S33), the projection controller 52 rotates the fan, which is the cooler 57, to cool the first optical element 33 (step S35).

The projection controller 52 then evaluates whether or not to keep using the projector (step S36). When it is determined to keep using the projector (Yes in step S36), the detector 53 detects the degradation parameter again after the predetermined period elapses. On the other hand, when it is determined not to keep using the projector (No in step S36), the projector is powered off (step S37).

That is, in the method for controlling the projection optical apparatus 55 according to the present embodiment, the first optical element 33 is cooled when the detection result exceeds the predetermined threshold, as the action of suppressing the degradation of the first optical element 33.

In the projection optical apparatus 55 according to the present embodiment, the cooler 57 cools the first optical element 33 when the degradation parameter detected by the detector 53 exceeds the predetermined threshold, whereby an abrupt temperature increase resulting from heat generation in the first optical element 33 is suppressed. The projection optical apparatus 55 according to the present embodiment can therefore provide the same effect as that provided in the first embodiment, for example, can suppress a decrease in the optical performance of the projection optical apparatus 55 resulting from the degradation of the first optical element 33.

In the present embodiment, in particular, the first optical element 33 is not rotated unlike in the first embodiment, whereby the amount of swing motion of a projection image on the screen S can be reduced. Further, the first optical element 33 does not need to have a rotationally symmetric shape, whereby the flexibility of the shape of the first optical element 33 can be increased.

4. Fourth Embodiment

A fourth embodiment of the present disclosure will be described below with reference to FIGS. 8 and 9.

The configuration of the projector according to the fourth embodiment is the same as that in the first embodiment but differs therefrom in terms of the configuration of the projection optical apparatus. The overall configuration of the projector is therefore not described.

Figure 8:
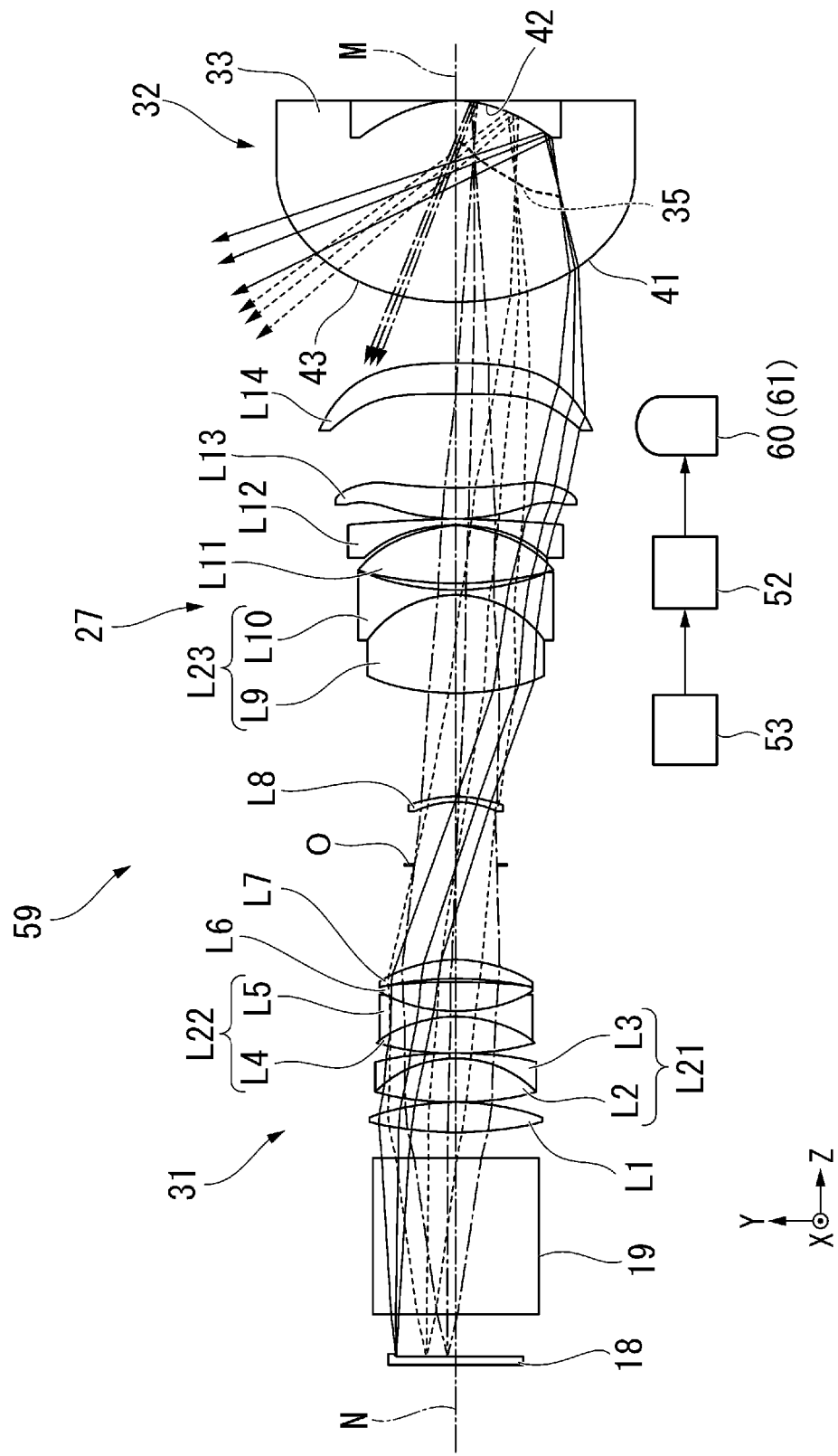
FIG. 8 is a schematic configuration diagram of the projection optical apparatus according to a fourth embodiment.

FIG. 8 is a schematic configuration diagram of a projection optical apparatus 59 according to the fourth embodiment.

In FIG. 8, components common to those in the figures used in the first embodiment have the same reference characters and will not be described.

The projection optical apparatus 59 according to the present embodiment includes the projection system 27, which projects a projection image on the screen S, a degradation suppressor 60, which suppresses degradation of the first optical element 33, the projection controller 52, which controls the degradation suppressor 60, and the detector 53, which detects the state of the degradation of the first optical element 33, as shown in FIG. 8.

In the projection system 27 according to the present embodiment, the first optical element 33 is configured to be exchanged by the user as required. The degradation suppressor 60 is formed of a notifier 61, which issues a notification that prompts the user to exchange the first optical element 33. The notifier 61 can, for example, be an LED indicator that emits light when the exchange is required. The notifier 61 may be configured to display, for example, a message stating, for example, "The time to exchange the projection lens has been reached. Exchange the projection lens." on the screen S. The notifier 61 may instead be configured to notify the exchange time in the form of voice.

The detector 53 can be any of a variety of methods presented in the second embodiment by way of example. The projection controller 52 controls the degradation suppressor 60 based on the result of the detection of the state of the degradation of the first optical element 33 performed by the detector 53. The notifier 61 issues a notification that prompts the user to exchange the first optical element 33 when the result of the detection performed by the detector 53 exceeds the predetermined threshold.

The other configurations of the projection optical apparatus 59 are the same as those of the projection optical apparatus 5 according to the first embodiment.

A method for controlling the projection optical apparatus 59 according to the present embodiment will be described below.

Figure 9:
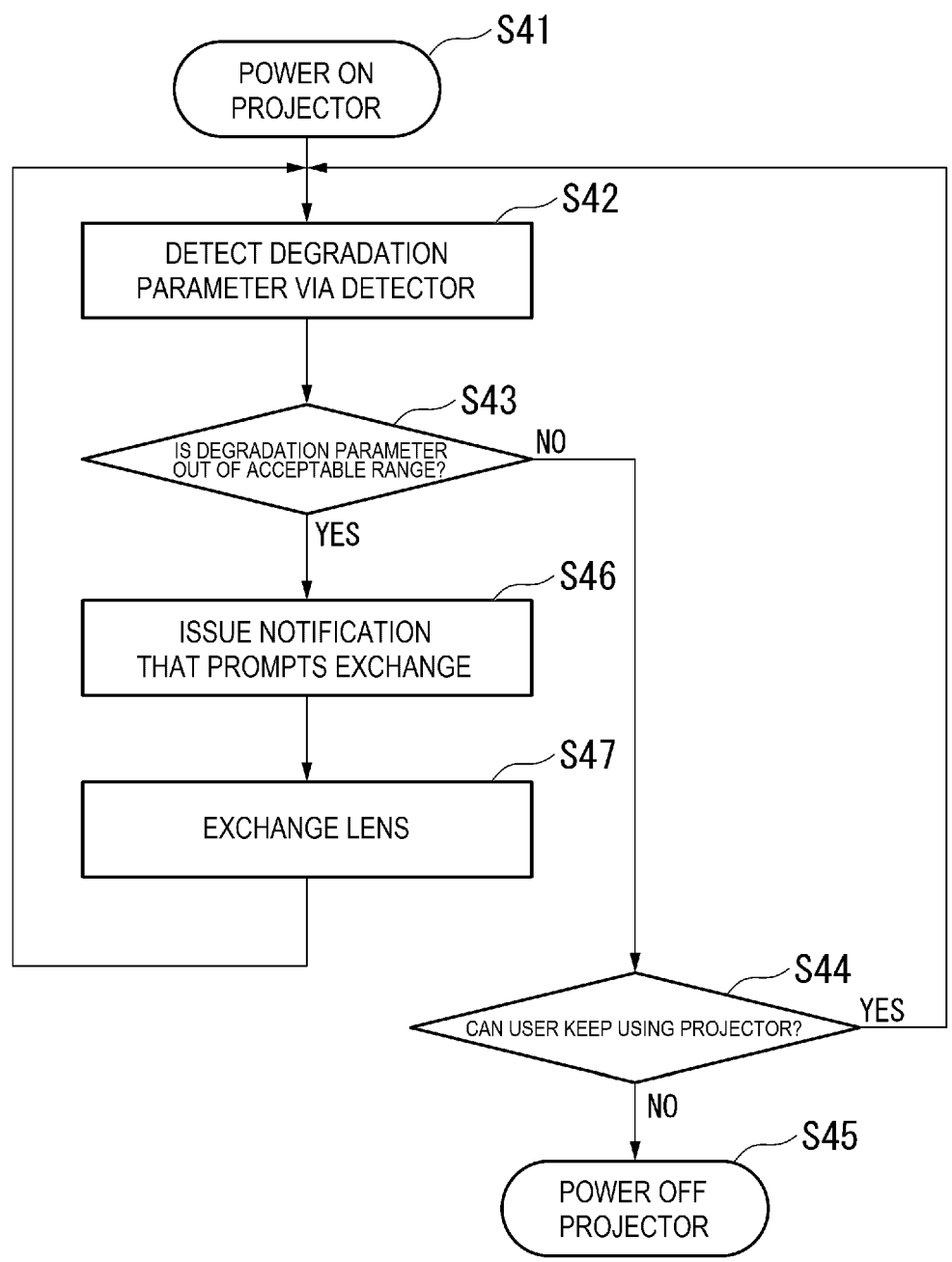
FIG. 9 is a flowchart showing a method for controlling the projection optical apparatus according to the fourth embodiment.

FIG. 9 is a flowchart showing the method for controlling the projection optical apparatus 59 according to the present embodiment.

First, to start using the projector, the user powers on the projector (step 41).

The detector 53 then uses any of the variety of methods described above to detect the degradation parameter of the first optical element 33 (step S42).

The projection controller 52 then evaluates whether or not the degradation parameter as the result of the detection performed by the detector 53 exceeds the predetermined threshold, that is, whether or not the degradation parameter is out of the acceptable range (step S43).

When the result of the evaluation shows that the degradation parameter falls within the acceptable range (No in step S43), the projection controller 52 evaluates whether or not to keep using the projector (step S44).

When it is determined to keep using the projector (Yes in step S44), the detector detects the degradation parameter again after the predetermined period elapses. On the other hand, when it is determined not to keep using the projector (No in step S44), the projector is powered off (step S45).

On the other hand, when the degradation parameter is out of the acceptable range (Yes in step S43), the projection controller 52 outputs a control signal to the notifier 61, and the notifier 61 issues a notification that prompts the user to exchange of the first optical element 33 (step S46). In this process, the notifier 61 may issue the notification only for a fixed period or may keep issuing the notification until the user completes the exchange operation.

The user then exchange the first optical element 33 (step S47).

The degradation parameter is then temporarily initialized, and the user keeps using the projector. Thereafter, when the predetermined period elapses, the detector 53 detects the degradation parameter again.

That is, in the method for controlling the projection optical apparatus 59 according to the present embodiment, a notification that prompts the user to exchange the first optical element 33 is issued as the action of suppressing the degradation of the first optical element 33 when the detection result exceeds the predetermined threshold.

In the projection optical apparatus 59 according to the present embodiment, the notifier 61 issues a notification that prompts the user to exchange the first optical element 33 when the degradation parameter detected by the detector 53 exceeds the predetermined threshold, and the user exchanges the current first optical element 33 with a new first optical element 33. The projection optical apparatus 59 according to the present embodiment can therefore also provide the same effect as that provided in the first embodiment, for example, can suppress a decrease in the optical performance of the projection optical apparatus 59 resulting from the degradation of the first optical element 33.

In the present embodiment, in particular, the degradation of the first optical element 33 is suppressed by exchanging the first optical element 33, so that the projection controller 52 does not need to control the degradation suppressor 60 in a complicated manner. Further, the first optical element 33 is not rotated unlike in the first embodiment, whereby the amount of swing motion of a projection image on the screen S can be reduced. Moreover, the first optical element 33 does not need to have a rotationally symmetric shape, whereby the flexibility of the shape of the first optical element 33 can be increased.

Fifth Embodiment

A fifth embodiment of the present disclosure will be described below with reference to FIG. 10.

The configuration of the projector according to the fifth embodiment is the same as that in the first embodiment but differs therefrom in terms of the configuration of the projection optical apparatus and the method for controlling the same. The overall configuration of the projector is therefore not described.

Figure 10:
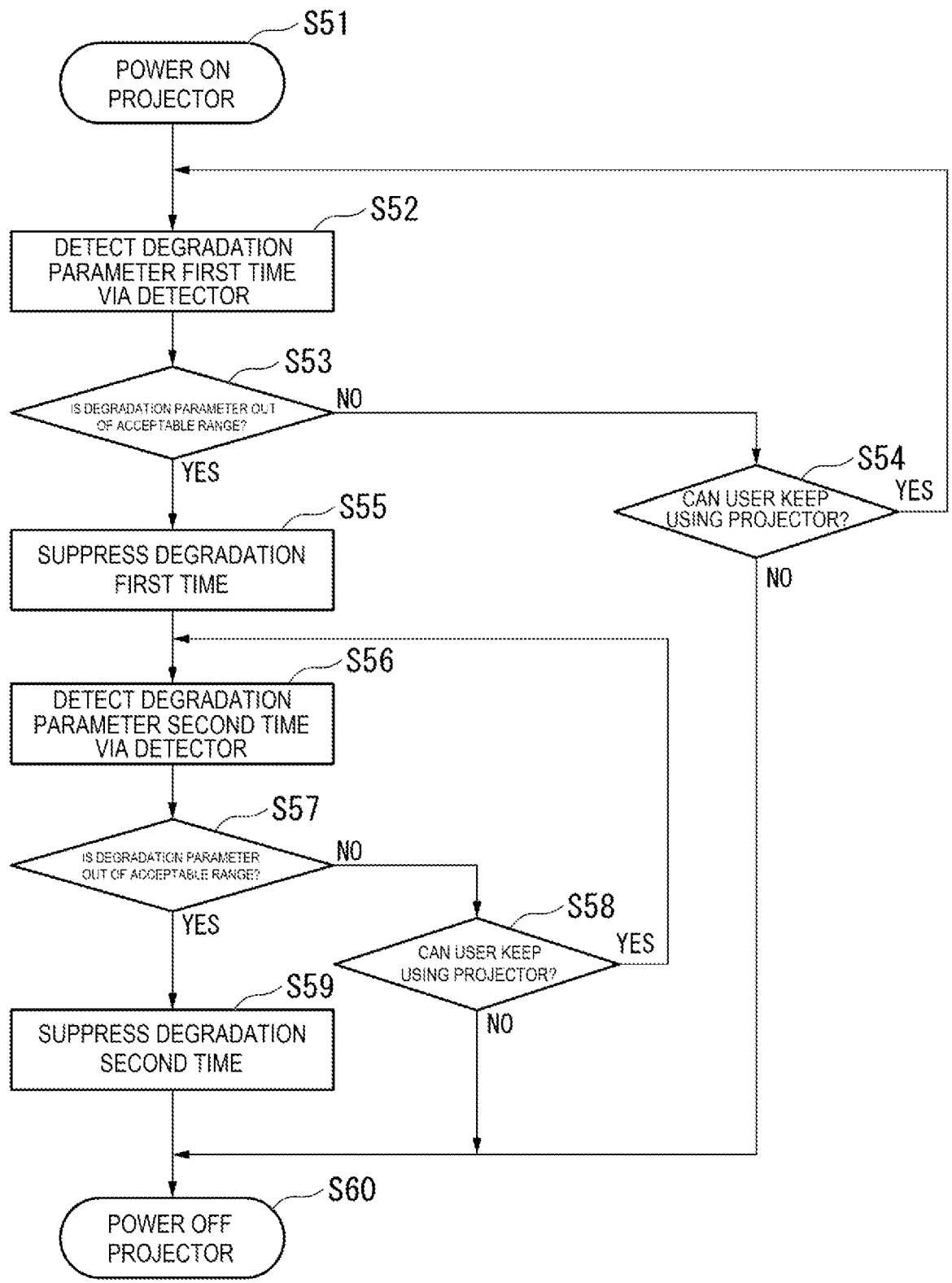
FIG. 10 is a flowchart showing a method for controlling the projection optical apparatus according to a fifth embodiment.

FIG. 10 is a flowchart showing the method for controlling the projection optical apparatus according to the present embodiment. In the present embodiment, no schematic configuration of the projection optical apparatus will be shown.

The projection optical apparatus according to the present embodiment includes the projection system 27, which projects a projection image on the screen S, degradation suppressors that suppress degradation of the first optical element 33, the projection controller 52, which controls the degradation suppressors, and the detector 53, which detects the state of degradation of the first optical element 33, as in the first to fourth embodiments. In the present embodiment, however, the projection optical apparatus includes two degradation suppressors different from each other out of the degradation suppressors presented by way of example in the first to fourth embodiments.

A method for controlling the projection optical apparatus according to the present embodiment will be described below.

First, to start using the projector, the user powers on the projector (step S51).

The detector 53 then detects first time the degradation parameter of the first optical element 33 (step S52).

The projection controller 52 then evaluates whether or not the degradation parameter as the result of the first detection performed by the detector 53 exceeds the predetermined threshold, that is, whether or not the degradation parameter is out of the acceptable range (step S53).

When the result of the evaluation shows that the degradation parameter falls within the acceptable range (No in step S53), the projection controller 52 evaluates whether or not to keep using the projector (step S54).

When it is determined to keep using the projector (Yes in step S54), the detector 53 performs the first-time detection of the degradation parameter again after the predetermined period elapses. On the other hand, when it is determined not to keep using the projector (No in step S54), the projector is powered off (step S60).

On the other hand, when the degradation parameter is out of the acceptable range (Yes in step S53), the projection controller 52 outputs a control signal to one of the two degradation suppressors, and the one degradation suppressor performs a first action of suppressing the degradation of the first optical element 33 (step S55).

The detector 53 then detects second time the degradation parameter of the first optical element 33 (step S56).

The projection controller 52 then evaluates whether or not the degradation parameter as the result of the second detection performed by the detector 53 exceeds the predetermined threshold, that is, whether or not the degradation parameter is out of the acceptable range (step S57).

When the result of the evaluation shows that the degradation parameter falls within the acceptable range (No in step S57), the projection controller 52 evaluates whether or not to keep using the projector (step S58).

When it is determined to keep using the projector (Yes in step S58), the detector 53 performs the second-time detection of the degradation parameter again after the predetermined period elapses. On the other hand, when it is determined not to keep using the projector (No in step S54), the projector is powered off (step S60).

On the other hand, when the degradation parameter is out of the acceptable range (Yes in step S57), the projection controller 52 outputs the control signal to the other one of the two degradation suppressors, and the other degradation suppressor performs a second action of suppressing the degradation of the first optical element 33 (step S59).

The first and second actions of suppressing the degradation of the first optical element 33 may be the combination of the actions of any of the degradation suppressors presented by way of example in the first to fourth embodiments. For example, the first optical element 33 is rotated or cooled as the first action, and a notification that prompts the user to exchange the first optical element 33 is issued as the second action.

In the projection optical apparatus according to the present embodiment, a predetermined action of suppressing the degradation of the first optical element 33 is performed when the degradation parameter detected by the detector 53 exceeds the predetermined threshold. The projection optical apparatus according to the present embodiment can also therefore provide the same effect as that provided in the first embodiment, for example, can suppress a decrease in the optical performance of the projection optical apparatus resulting from the degradation of the first optical element 33. In the present embodiment, in particular, two types of action of suppressing the degradation of the first optical element 33 are combined with each other, whereby a decrease in the optical performance of the projection optical apparatus resulting from the degradation of the first optical element 33 can be more reliably suppressed.

The present embodiment has been described with reference to the case where the action of suppressing the degradation of the first optical element 33 is performed twice by way of example. It is, however, noted that when the action of suppressing the degradation is performed multiple times, the number of actions is not limited to a specific number. The action of suppressing the degradation may be performed three times or more, for example, the first optical element 33 may be rotated, cooled, and exchanged.

Sixth Embodiment

A sixth embodiment of the present disclosure will be described below with reference to FIG. 11.

The configuration of the projector according to the sixth embodiment is the same as that in the first embodiment but differs therefrom in terms of the configuration of the projection optical apparatus. The overall configuration of the projector is therefore not described.

Figure 11:
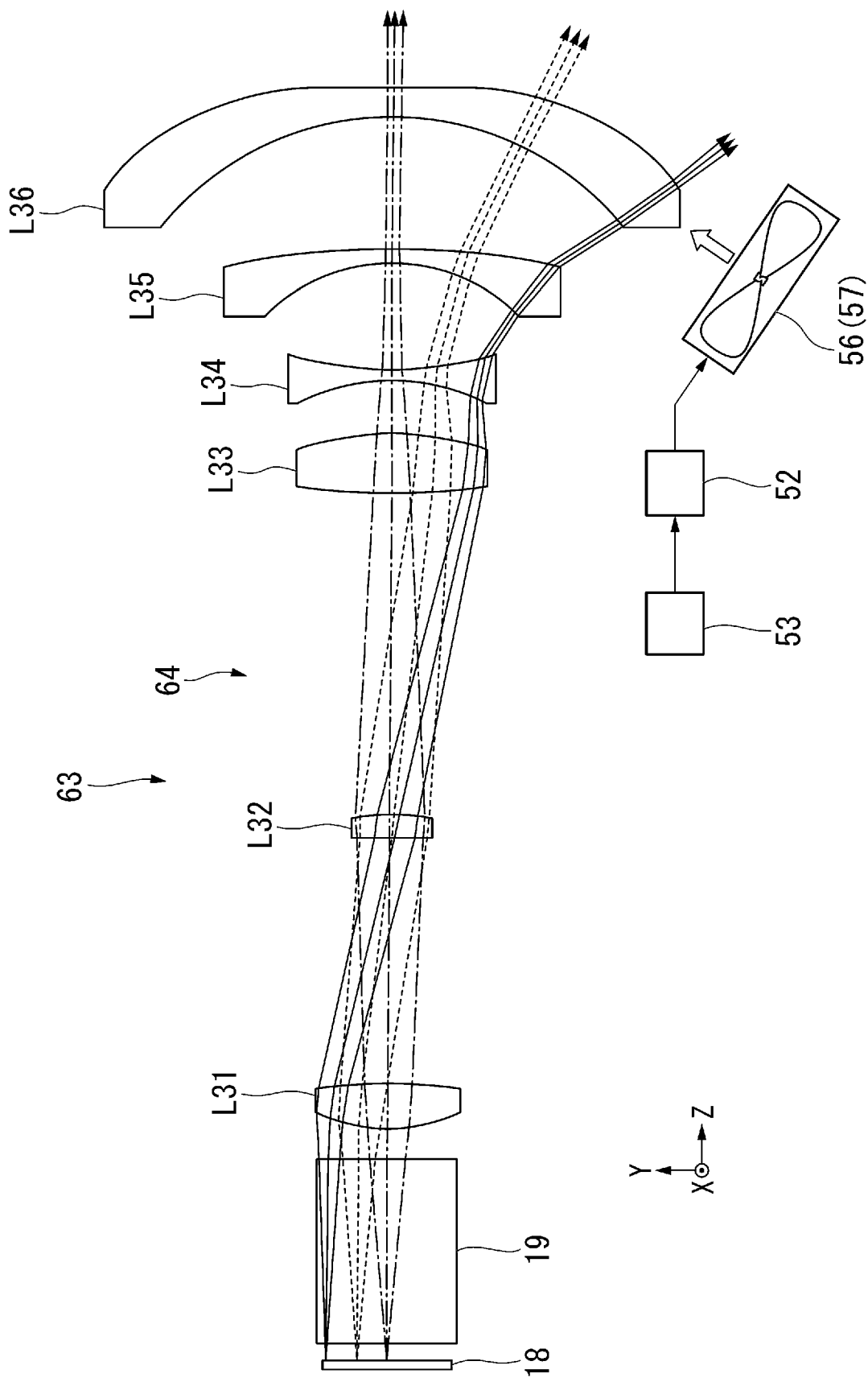
FIG. 11 is a schematic configuration diagram of the projection optical apparatus according to a sixth embodiment.

FIG. 11 is a schematic configuration diagram of a projection optical apparatus 63 according to the sixth embodiment.

In FIG. 11, components common to those in the figures used in the first embodiment have the same reference characters and will not be described.

The projection optical apparatus 63 according to the present embodiment includes a projection system 64, which projects a projection image on the screen S, the degradation suppressor 56, which suppresses degradation of a lens L36, which will be described later, the projection controller 52, which controls the degradation suppressor 56, and the detector 53, which detects the state of the degradation of the lens L36, as shown in FIG. 11.

The projection system 27 in the first to fifth embodiments is a reflective/refractive optical system, whereas the projection system 64 in the present embodiment is a transmissive/refractive optical system formed of a plurality of lenses.

That is, the projection optical apparatus 63 according to the present embodiment is formed of a transmissive/refractive projection optical apparatus. Therefore, in the present embodiment, the screen S, which is not shown, is installed on the side to which the direction in which the image light exits out of the light modulators 18 is oriented, and a projection image is projected on the screen S.

The projection system 64 includes six lenses L31 to L36. The lenses L31 to L36 are arranged in the presented order from the demagnifying side toward the magnifying side. In the present embodiment, the lens L36, which is disposed in a position closest to the magnifying side, is formed of a resin lens. The projection optical apparatus 63 therefore includes the degradation suppressor 56, which is formed of the cooler 57, which cools the lens L36.

The projection optical apparatus 63 according to the present embodiment can also provide the same effect as that provided in the first embodiment, for example, can suppress a decrease in the optical performance of the projection optical apparatus resulting from the degradation of the lens L36.

The technical scope of the present disclosure is not limited to those in the embodiments described above, and a variety of changes can be made thereto to the extent that the changes do not depart from the substance of the present disclosure.

For example, as an example of the projection optical apparatus including no detector, the first embodiment described above presents the configuration in which the rotation driver rotates the resin lens when the projector is powered on, and the configuration may be replaced with a configuration in which a fan is continuously operated after the projector is powered on and a cooler continuously cools the resin lens.

The aforementioned embodiments have each been described with reference to the case where the projection optical apparatus according to the present disclosure is incorporated in a projector using liquid crystal light valves, but not necessarily. The projection optical apparatus according to the present disclosure may be incorporated in a projector using a digital micromirror device as each of the light modulators. The projector may not include a plurality of light modulators and may instead include only one light modulator.

In addition to the above, the specific number, arrangement, shape, material, and other factors of the variety of components that form the projection optical apparatus and the projector are not limited to those in the embodiments described above and can be changed as appropriate.

The projection optical apparatus according to the aspect of the present disclosure may have the configuration below.

The projection optical apparatus according to the aspect of the present disclosure may further include a detector configured to detect the state of the degradation of the resin lens, and the controller may control the degradation suppressor based on the detection result of the detector.

In the projection optical apparatus according to the aspect of the present disclosure, the degradation suppressor may include a rotation driver configured to rotate the resin lens around a rotation axis along the optical axis of the projection system, and the rotation driver may rotate the resin lens by a predetermined angle when the detection result exceeds a predetermined threshold.

In the projection optical apparatus according to the aspect of the present disclosure, the degradation suppressor may include a cooler configured to cool the resin lens, and the cooler may cool the resin lens when the detection result exceeds the predetermined threshold.

In the projection optical apparatus according to the aspect of the present disclosure, the resin lens may be provided in an exchangeable manner, the degradation suppressor may include a notifier configured to notify a user, and the notifier may notify the user of a promotion of a replacement of the resin lens when the detection result exceeds the predetermined threshold.

In the projection optical apparatus according to the aspect of the present disclosure, the detector may include an imager configured to capture an image of the projection image on the projection surface, and the controller may control the degradation suppressor based on information on the luminance of the captured image of the projection image.

In the projection optical apparatus according to the aspect of the present disclosure, the detector may include a temperature detector configured to detect the temperature of the resin lens, and the controller may control the degradation suppressor based on information on the detected temperature.

In the projection optical apparatus according to the aspect of the present disclosure, the detector may include a leakage light detector configured to detect light leaking from the resin lens, and the controller may control the degradation suppressor based on information on the intensity of the detected leakage light.

In the projection optical apparatus according to the aspect of the present disclosure, the detector may include a thickness detector configured to detect the thickness of the resin lens in the optical axis direction thereof, and the controller may control the degradation suppressor based on information on the thickness of the resin lens.

In the projection optical apparatus according to the aspect of the present disclosure, the degradation suppressor may include a rotation driver configured to rotate the resin lens around a rotation axis along the optical axis of the projection system, and the rotation driver may rotate the resin lens.

In the projection optical apparatus according to the aspect of the present disclosure, the degradation suppressor may include a cooler configured to cool the resin lens.

The projector according to the aspect of the present disclosure may have the configurations below.

The projector according to the aspect of the present disclosure may include a light emission period detector configured to detect the light emission period for which the light source emits light and may control the degradation suppressor based on information on the light emission period.

The projector according to the aspect of the present disclosure may include a luminescence intensity detector configured to detect the intensity of the light emitted from the light source and may control the degradation suppressor based on information on the detected luminescence intensity.

The projector according to the aspect of the present disclosure may include a luminance information detector configured to detect luminance information obtained from the image information and may control the degradation suppressor based on the detected luminance information.

The method for controlling a projection optical apparatus according to the aspect of the present disclosure may have the configuration below.

In the method for controlling a projection optical apparatus according to the aspect of the present disclosure, the suppression operation may rotates the resin lens by a predetermined angle when the detection result exceeds a predetermined threshold.

In the method for controlling a projection optical apparatus according to the aspect of the present disclosure, the suppression operation may cool the resin lens when the detection result exceeds the predetermined threshold.

In the method for controlling a projection optical apparatus according to the aspect of the present disclosure, the suppression operation may notify a user of a promotion of a replacement of the resin lens when the detection result exceeds the predetermined threshold.

What is claimed is:

1. A projection optical apparatus comprising:
a projection system projecting light and including a resin lens;
a degradation suppressor configured to suppress degradation of the resin lens;
a projection controller configured to control the degradation suppressor; and
a detector configured to detect a state of the degradation of the resin lens, wherein:
the projection controller controls the degradation suppressor based on a detection result of the detector,
the degradation suppressor includes a rotation driver configured to rotate the resin lens around a rotation axis along an optical axis of the projection system,
the rotation driver rotates the resin lens by a predetermined angle when the detection result exceeds a predetermined threshold, and
the projection controller is configured to control the rotation driver to rotate the resin lens so that a position of an exit pupil moves along a circumferential direction around the rotation axis.

2. The projection optical apparatus according to claim 1, wherein the degradation suppressor includes a cooler configured to cool the resin lens, and
the cooler cools the resin lens when the detection result exceeds the predetermined threshold.

3. The projection optical apparatus according to claim 1, wherein the resin lens is provided in an exchangeable manner,
the degradation suppressor includes a notifier configured to notify a user, and
the notifier notifies the user of a promotion of a replacement of the resin lens when the detection result exceeds the predetermined threshold.

4. The projection optical apparatus according to claim 1, wherein the detector includes an imager configured to capture an image of a projection image on a projection surface, and
the projection controller controls the degradation suppressor based on information on luminance of the captured image of the projection image.

5. The projection optical apparatus according to claim 1, wherein the detector includes a temperature detector configured to detect a temperature of the resin lens, and
the projection controller controls the degradation suppressor based on information on the detected temperature.

6. The projection optical apparatus according to claim 1, wherein the detector includes a leakage light detector configured to detect leakage light leaking from the resin lens, and
the projection controller controls the degradation suppressor based on information on intensity of the detected leakage light.

7. The projection optical apparatus according to claim 1, wherein the detector includes a thickness detector configured to detect a thickness of the resin lens in an optical axis direction thereof, and the controller controls the degradation suppressor based on information on the detected thickness of the resin lens.

8. The projection optical apparatus according to claim 1, wherein the rotation driver continuously rotates the resin lens.

9. The projection optical apparatus according to claim 1, wherein the degradation suppressor includes a cooler configured to cool the resin lens.

10. A projector comprising:
a light source;
a light modulator modulating light emitted from the light source in accordance with image information; and
the projection optical apparatus according to claim 1 projecting the light modulated by the light modulator.

11. The projector according to claim 10, further comprising
a light emission period detector configured to detect a light emission period for which the light source emits light,
wherein the projection controller controls the degradation suppressor based on information on the detected light emission period.

12. The projector according to claim 10, further comprising
a luminescence intensity detector configured to detect intensity of the light emitted from the light source,
wherein the projection controller controls the degradation suppressor based on information on the detected luminescence intensity.

13. The projector according to claim 10, further comprising
a luminance information detector configured to detect luminance information obtained from the image information,
wherein the projection controller controls the degradation suppressor based on the detected luminance information.

14. The projection optical apparatus according to claim 1, wherein the resin lens includes a light incident surface, a first reflection surface and a first light exiting surface, and the rotation driver is located on a side of the first reflection surface opposite from the light incident surface and the first light exiting surface.

15. A method for controlling a projection optical apparatus including a projection system projecting light and including a resin lens, the method comprising:
detecting a state of degradation of the resin lens; and
performing a suppression operation of suppressing the degradation of the resin lens based on a detection result of the degradation state, wherein:
degradation of the resin is suppressed using a rotation driver configured to rotate the resin lens around a rotation axis along an optical axis of the projection system,
the rotation driver rotates the resin lens by a predetermined angle when the detection result exceeds a predetermined threshold, and
the rotation driver is controlled to rotate the resin lens so that a position of an exit pupil moves along a circumferential direction around the rotation axis.

16. The method for controlling a projection optical apparatus according to claim 15,
wherein the suppression operation cools the resin lens when the detection result exceeds the predetermined threshold.

17. The method for controlling a projection optical apparatus according to claim 15,
wherein the suppression operation notifies a user of a promotion of a replacement of the resin lens when the detection result exceeds the predetermined threshold.

* * * * *